United States Patent
Ramaprabhu et al.

(10) Patent No.: US 9,464,220 B2
(45) Date of Patent: Oct. 11, 2016

(54) NANOFLUID COOLANT

(75) Inventors: Sundara Ramaprabhu, Chennai (IN); Jyothirmayee Aravind Sasidharannair Sasikaladevi, Trivandrum (IN)

(73) Assignee: Indian Institute of Technology Madras (IN)

( * ) Notice: Subject to any disclaimer, the term of this patent is extended or adjusted under 35 U.S.C. 154(b) by 551 days.

(21) Appl. No.: 13/883,505

(22) PCT Filed: Dec. 21, 2011

(86) PCT No.: PCT/IB2011/003101
§ 371 (c)(1),
(2), (4) Date: May 3, 2013

(87) PCT Pub. No.: WO2013/057535
PCT Pub. Date: Apr. 25, 2013

(65) Prior Publication Data
US 2013/0221267 A1    Aug. 29, 2013

(30) Foreign Application Priority Data
Oct. 19, 2011   (IN) ............................ 3590/CHE/2011

(51) Int. Cl.
*C09K 5/00* (2006.01)
*C09K 3/18* (2006.01)
(Continued)

(52) U.S. Cl.
CPC .................. *C09K 5/10* (2013.01); *B82Y 30/00* (2013.01); *C01G 45/02* (2013.01); *C01P 2004/13* (2013.01); *C01P 2004/54* (2013.01); *C01P 2004/64* (2013.01)

(58) Field of Classification Search
CPC ...... C01G 45/1207; C09K 5/00; C09K 5/08; C09K 5/14; C09K 5/20; B82Y 40/00
USPC .................................................... 252/70, 71
See application file for complete search history.

(56) References Cited

U.S. PATENT DOCUMENTS 7,084,002 B2 *   8/2006   Kim ..................... H01G 11/46
                                                               438/104
7,713,660 B2 *   5/2010   Kim ..................... B82Y 30/00
                                                               423/605

(Continued)

FOREIGN PATENT DOCUMENTS

CN    101402471 A    4/2009
CN    101698512 A    4/2010

(Continued)

OTHER PUBLICATIONS

Qi Feng, Inorganic and Metallic Nanotubular Materials, Series: Topics in Applied Physics, Chapter 6 "Synthesis and Applications of Manganese Oxide Nanotubes", vol. 117, pp. 73-82, Mar. 5, 2010.*

(Continued)

*Primary Examiner* — Jane L Stanley
(74) *Attorney, Agent, or Firm* — Moritt Hock & Hamroff LLP; Steven S. Rubin, Esq.

(57) ABSTRACT

Technologies are generally described for forming a nanofluid coolant and structures including a nanofluid coolant. In an example, a method of forming a nanofluid coolant may comprise combining a compound with an acid and with purified water to form a solution. The compound may include manganese. The method may further include heating the solution and, after heating the solution, cooling the solution effective to form at least one precipitate that includes manganese and oxygen. The method may further include filtering the at least one precipitate to form a powder that includes manganese oxide nanotubes. The method may further include functionalizing the nanotubes by irradiating them with UV radiation. The method may further include combining the functionalized manganese oxide nanotubes with a polar solvent to form the nanofluid coolant.

9 Claims, 7 Drawing Sheets

(51) Int. Cl.
*C09K 5/10* (2006.01)
*C01G 45/02* (2006.01)
*B82Y 30/00* (2011.01)

(56) References Cited

U.S. PATENT DOCUMENTS

| | | | | |
|---|---|---|---|---|
| 7,736,485 | B2* | 6/2010 | Maddan | C09C 1/0018 |
| | | | | 204/253 |
| 2007/0158611 | A1 | 7/2007 | Oldenburg | |
| 2007/0292338 | A1* | 12/2007 | Kogiso | B82Y 30/00 |
| | | | | 423/604 |
| 2008/0017827 | A1 | 1/2008 | Ito et al. | |
| 2008/0164141 | A1* | 7/2008 | El-Shall | B82Y 30/00 |
| | | | | 204/157.21 |
| 2008/0302998 | A1* | 12/2008 | Hong | C09K 5/10 |
| | | | | 252/74 |
| 2009/0142666 | A1* | 6/2009 | Kim | B82Y 30/00 |
| | | | | 429/224 |
| 2010/0320089 | A1* | 12/2010 | Misra | B82Y 30/00 |
| | | | | 205/109 |
| 2011/0003721 | A1 | 1/2011 | Hong et al. | |

FOREIGN PATENT DOCUMENTS

| | | |
|---|---|---|
| CN | 102070196 A | 5/2011 |
| CN | 102161511 A | 8/2011 |
| EP | 1564277 B1 | 6/2007 |
| EP | 1792873 A1 | 6/2007 |
| WO | 2010092586 A1 | 8/2010 |
| WO | WO 2011116080 A1 * | 9/2011 ............ H01M 4/48 |

OTHER PUBLICATIONS

Xiao et al., "Microstructural Characteristics of Chemically Processed Manganese Oxide Nanofibres", Acta Mater., vol. 45, No. 4, p. 1685-1693, Published Apr. 1997.*
Xiao, W. et al., Growth of single-crystal α-MnO2 nanotubes prepared by a hydrothermal route and their electrochemical properties, Journal of Power Sources, 2009, 935-938, 193.
Jha, N. and S. Ramaprabhu, Synthesis and Thermal Conductivity of Copper Nanoparticle Decorated Multiwalled Carbon Nanotubes Based Nanofluids, J. Phys. Chem. C, 2008, 9315-9319, 112.
Murshed, S.M.S. et al., Enhanced thermal conductivity of TiO2—water based Nanofluids, International Journal of Thermal Sciences, 2005, 367-373, 44.
Eastman, J.A. et al., Enhanced thermal conductivity, through the development of nanfluids, Proc.symposium Nanophase and nanocomposite materials II, Materials Research Society, Boston, MA, 1997, p. 3-11, 457.
Choi, Z.G. et al., Anomalous thermal conductivity enhancement in nano-tube suspensions, Appl.Phys.Lett., 2001, 2252-225, 79.
Zhu, H. T. et al., Novel Synthesis and Thermal Conductivity of CuO Nanofluid, J. Phys. Chem. C, 2007, 1646-1650, 111.
Xie, H.Q. et al., Thermal conductivity enhancement of suspensions containing nanosized Alumina particles, J. App. Phys., 2002, 4568-4572, 91.
Alternative Energy and Nanotechnology Laboratory, Sundara Ramaprabhu's Research Page, 2010, 5 pages.
International Search Report and Written Opinion for application with application No. PCT/IB2011/003101, dated Apr. 13, 2012, 14 pages.

* cited by examiner

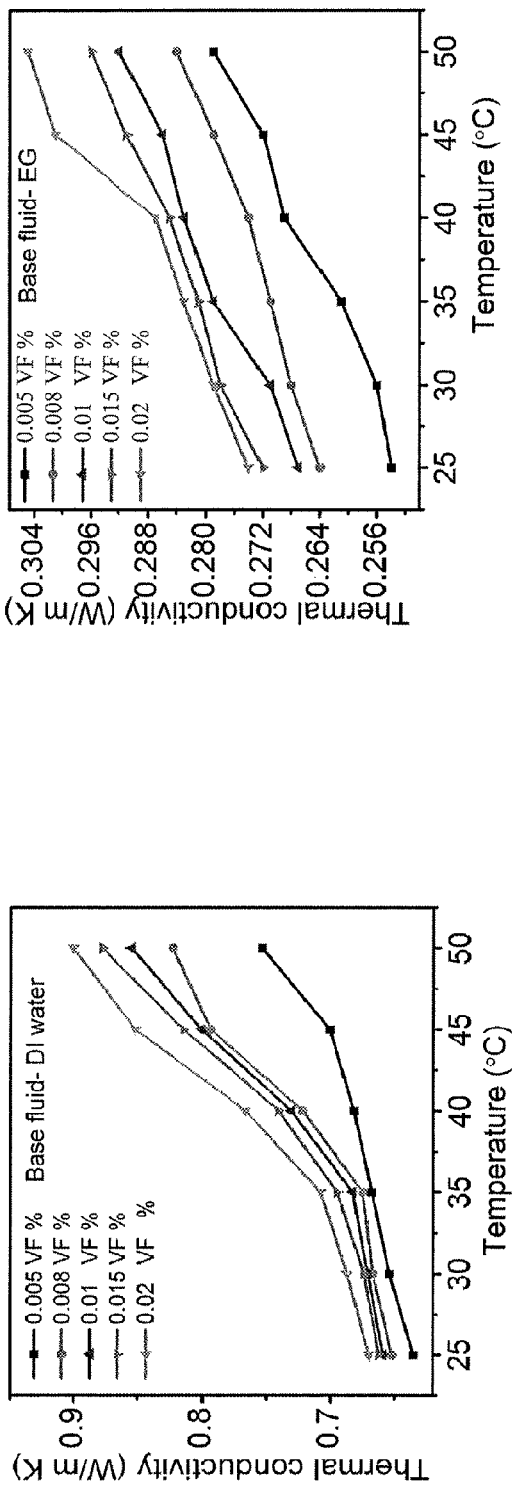
Fig. 6
Fig. 5
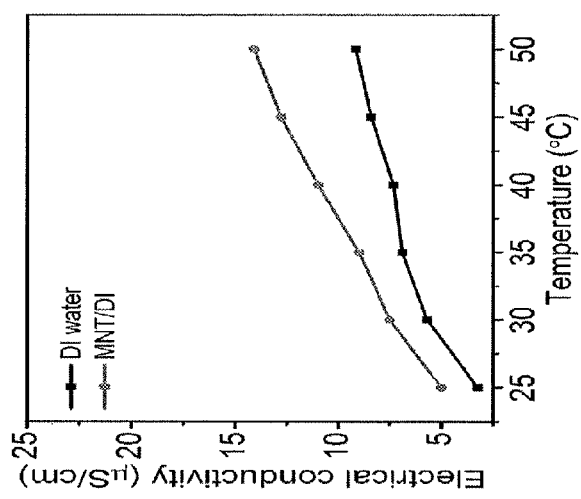
Fig. 7

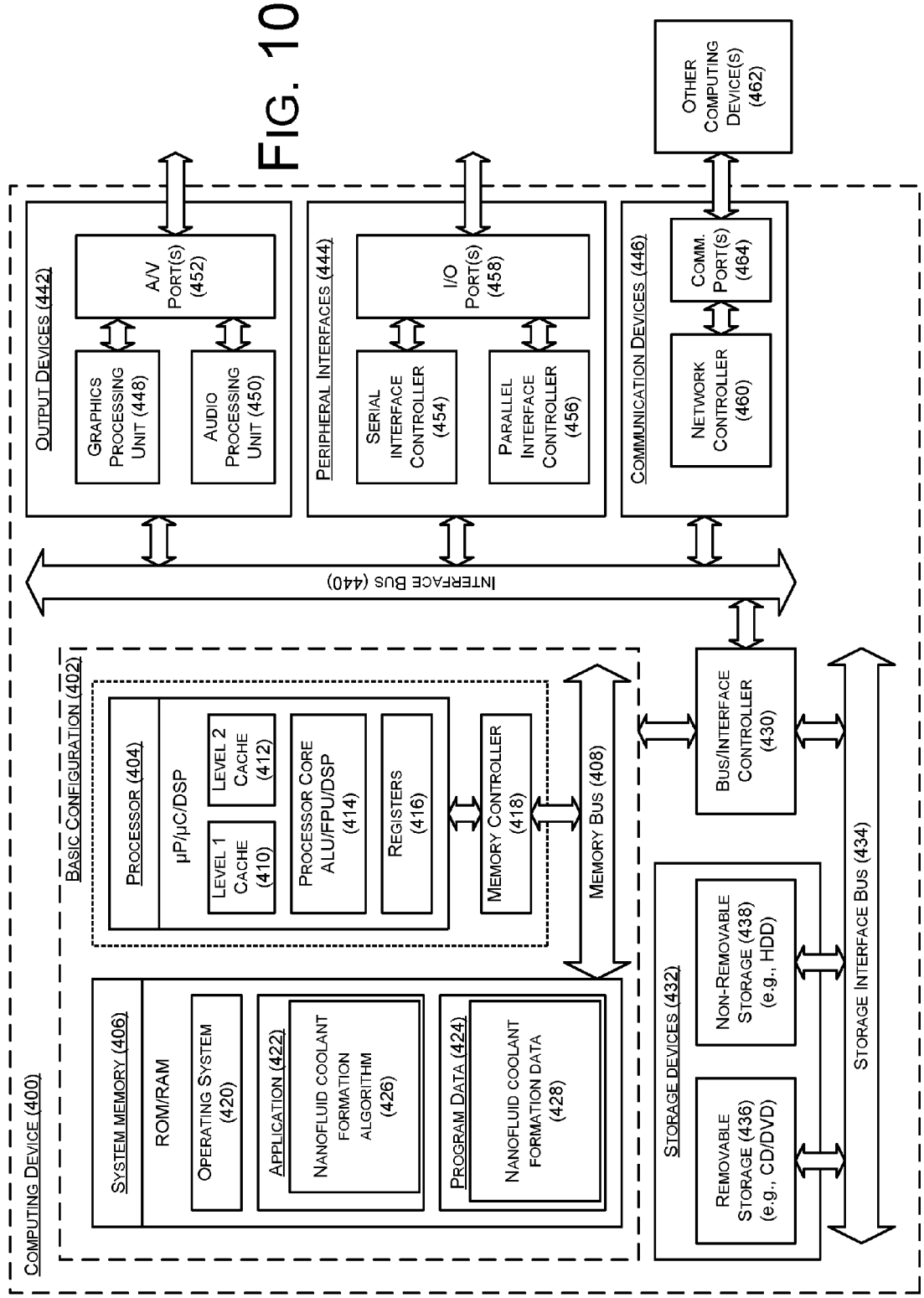

NANOFLUID COOLANT

CROSS REFERENCE TO RELATED APPLICATIONS

This application is a U.S. national stage filing under 35 U.S.C. §371 of International Application No. PCT/IB2011/003101 filed Dec. 21, 2011, which in turn claims priority to the Indian Patent Application No. 3590/CHE/2011 filed Oct. 19, 2011, the entirety of which is hereby incorporated by reference.

BACKGROUND

Unless otherwise indicated herein, the materials described in this section are not prior art to the claims in this application and are not admitted to be prior art by inclusion in this section.

Cooling methods may be used to maintain reliability and performance of devices such as computers, power electronics, car engines, etc. Air cooling may be used to cool some devices by blowing air across the device so that heat may flow from the device to the air. A heat transfer fluid may be used in liquid cooling where heat from the device may flow to the fluid such as by immersion of the device in the fluid or through application by a jet impingement of the fluid upon a hot spot in the device.

SUMMARY

In some examples, a method of forming a nanofluid is generally described. The method may include combining a compound with an acid and with purified water to form a solution. The compound may include manganese. The method may further include heating the solution and, after heating the solution, cooling the solution effective to form at least one precipitate that includes manganese and oxygen. The method may further include filtering the at least one precipitate to form a powder that includes manganese oxide nanotubes. The method may further include combining the manganese oxide nanotubes with a polar solvent to form the nanofluid coolant.

In some examples, a system effective to implement a method of forming a nanofluid is generally described. In some examples, the system may include a first container, an oven, a filter and a second container arranged in operative relationship. The first container may be configured to receive a solution. The solution may include a compound, an acid, and purified water. The compound may include manganese. The oven may be arranged in operative relationship with the first container. The oven may be configured to receive the solution, and heat the solution to form at least one precipitate. The at least one precipitate may include manganese and oxygen. A filter may be arranged in operative relationship with the oven. The filter may be configured to receive and filter the at least one precipitate to form a powder. The powder may include manganese oxide nanotubes. The second container may be arranged in operative relationship with the filter. The second container may be configured to receive the powder and combine the manganese oxide nanotubes with a polar solvent to form the nanofluid coolant.

In some examples a nanofluid is generally described. In some examples, the nanofluid coolant may include functionalized manganese oxide nanotubes and a polar solvent.

In some examples a method of forming a nanofluid is generally described. The method may include combining $KMnO_4$ with an acid and with purified water to form a solution. The method may further include heating the solution; and after heating the solution, cooling the solution effective to form at least one precipitate that includes manganese and oxygen. The method may further include filtering the at least one precipitate to form a powder that includes manganese oxide nanotubes. The method may further include irradiating the powder with electromagnetic radiation effective to form functionalized manganese oxide nanotubes. The method may further include combining the functionalized manganese oxide nanotubes with a polar solvent to form the nanofluid. An electrical conductivity of the nanofluid may be greater than about 53% of the electrical conductivity of the polar solvent at a temperature in a range of about 23 degrees Celsius to about 52 degrees Celsius. A thermal conductivity of the nanofluid may be greater than about 45% of the thermal conductivity of the polar solvent at a temperature in a range of about 23 degrees Celsius to about 52 degrees Celsius. A volume percentage of the functionalized manganese oxide nanotubes in the nanofluid may be less than about 0.04 volume %.

In some examples, a nanofluid is generally described. The nanofluid may include functionalized manganese oxide nanotubes and a polar solvent. An electrical conductivity of the nanofluid may be greater than about 53% of the electrical conductivity of the polar solvent at a temperature in a range of about 23 degrees Celsius to about 52 degrees Celsius. A thermal conductivity of the nanofluid may be greater than about 45% of the thermal conductivity of the polar solvent at a temperature in a range of about 23 degrees Celsius to about 52 degrees Celsius. A volume percentage of the functionalized manganese oxide nanotubes in the nanofluid may be less than about 0.04 volume %.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 illustrates a graph of Thermal conductivity (W/m K) v. Temperature (degrees Celsius) for $MnO_2$ nanotubes in a base fluid of de-ionized water;

FIG. 6 illustrates a graph of Thermal conductivity (W/m K) v. Temperature (degrees Celsius) for $MnO_2$ nanotubes in a base fluid of ethylene glycol;

FIG. 7 illustrates a graph of Electrical conductivity (μS/cm) v. Temperature (degrees Celsius) for de-ionized water and for $MnO_2$ nanotubes combined with a base fluid of de-ionized water;

FIG. 10 is a block diagram illustrating an example computing device that is arranged to implement nanofluid coolant formation;

Figure 1:
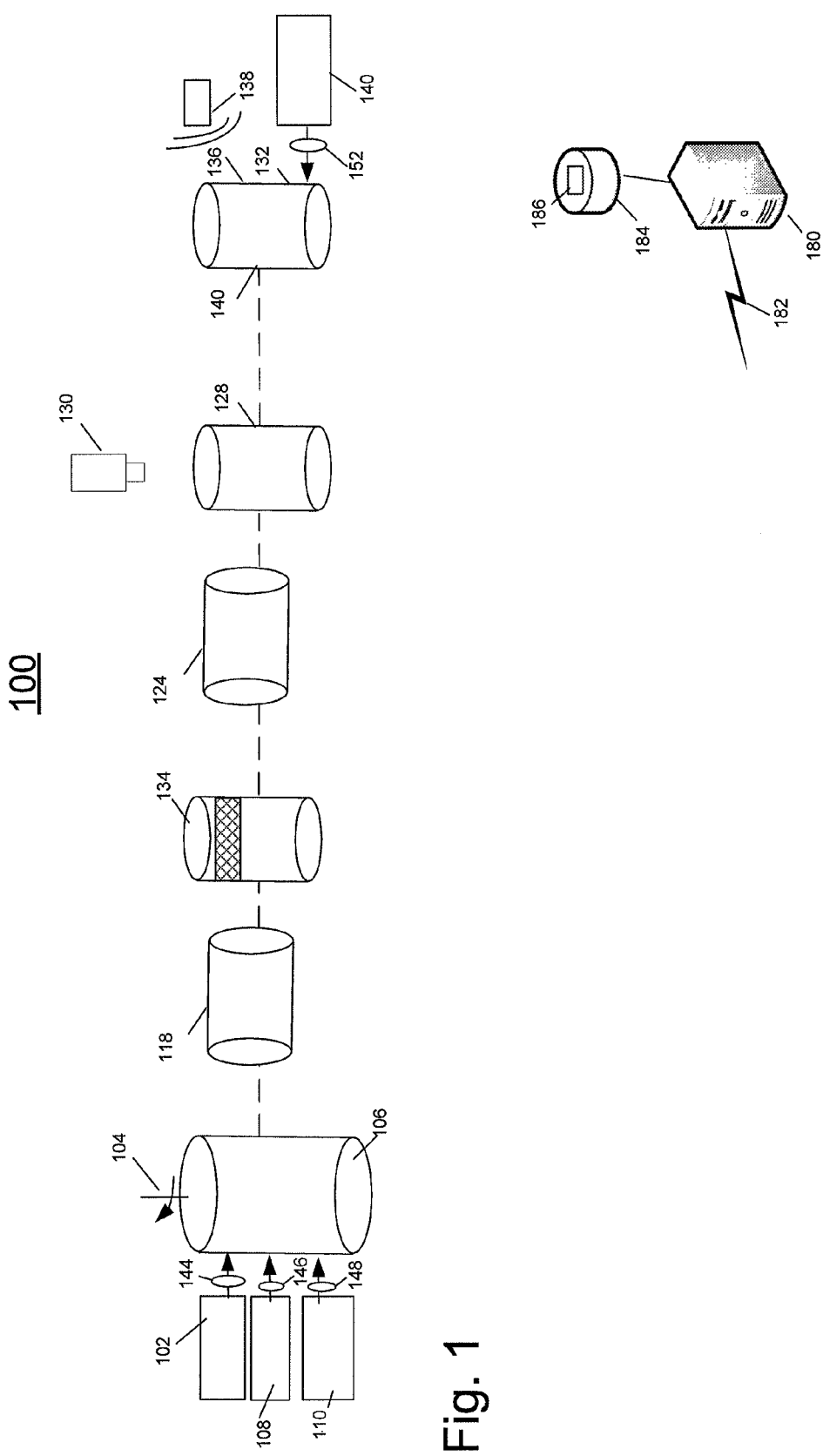
FIG. 1 illustrates an example system that can be utilized to implement nanofluid coolant formation.

all arranged according to at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to systems, methods, materials and apparatus related to a nanofluid coolant and the formation of a nanofluid coolant.

Briefly stated, technologies are generally described for forming a nanofluid coolant and structures including a nanofluid coolant. In an example, a method of forming a nanofluid coolant may comprise combining a compound with an acid and with purified water to form a solution. The compound may include manganese. The method may further include heating the solution and, after heating the solution, cooling the solution effective to form at least one precipitate that includes manganese and oxygen. The method may further include filtering the at least one precipitate to form a powder that includes manganese oxide nanotubes. The method may further include functionalizing the nanotubes by irradiating them with UV radiation. The method may further include combining the functionalized manganese oxide nanotubes with a polar solvent to form the nanofluid coolant.

It will also be understood that any compound, material or substance which is expressly or implicitly disclosed in the specification and/or recited in a claim as belonging to a group or structurally, compositionally and/or functionally related compounds, materials or substances, includes individual representatives of the group and all combinations thereof.

As discussed in more detail below, manganese oxide nanotubes may be formed and combined with a base liquid to form a nanofluid coolant. In some examples, the nanotubes may be hollow such as having an internal cavity that may or may not be symmetrical such as being substantially hollow, approximately hollow, partially filled, non-symmetrically hollow, etc. The nanotubes may have at least two physical dimensions each between about 1 nm and 100 nm. In some examples, the nanotubes may have a tube shape with a diameter in a range of about 25 nm to about 100 nm, a length in a range of about 1 mm to about 10 mm and/or an aspect ratio of about 10 to about 100. In some examples, as explained in more detail below, combining the manganese oxide nanotubes with the base liquid may form a nanofluid coolant with relatively higher thermal conductivity and with relatively little increased electrical conductivity compared with the base liquid alone.

FIG. 1 illustrates an example system that can be utilized to form a nanofluid coolant in accordance with at least some embodiments described herein. An example nanofluid coolant formation system 100 may include a source of a compound 102, a source of an acid 108, a source of purified water 110, and/or a source of a base fluid 140. Nanofluid coolant formation system 100 may further include a container 106, an oven 118, a filter 134, an oven 124, a container 128, an electromagnetic radiation source 130, a container 136 and/or a sonicator 138 all disposed in operative relationship. Sources 102, 108 and 110 and container 106 may be configured in communication through respective valves 144, 146 and 148. Source 140 and container 136 may be configured in communication through a valve 152. At least some of these elements may be arranged in communication with a processor 180 through a communication link 182. In some examples, processor 180 may be adapted in communication with a memory 184 that may include instructions 186 stored therein. Processor 180 may be configured, such as by instructions 186, to control at least some of the operations/actions/functions described below.

Figure 2:
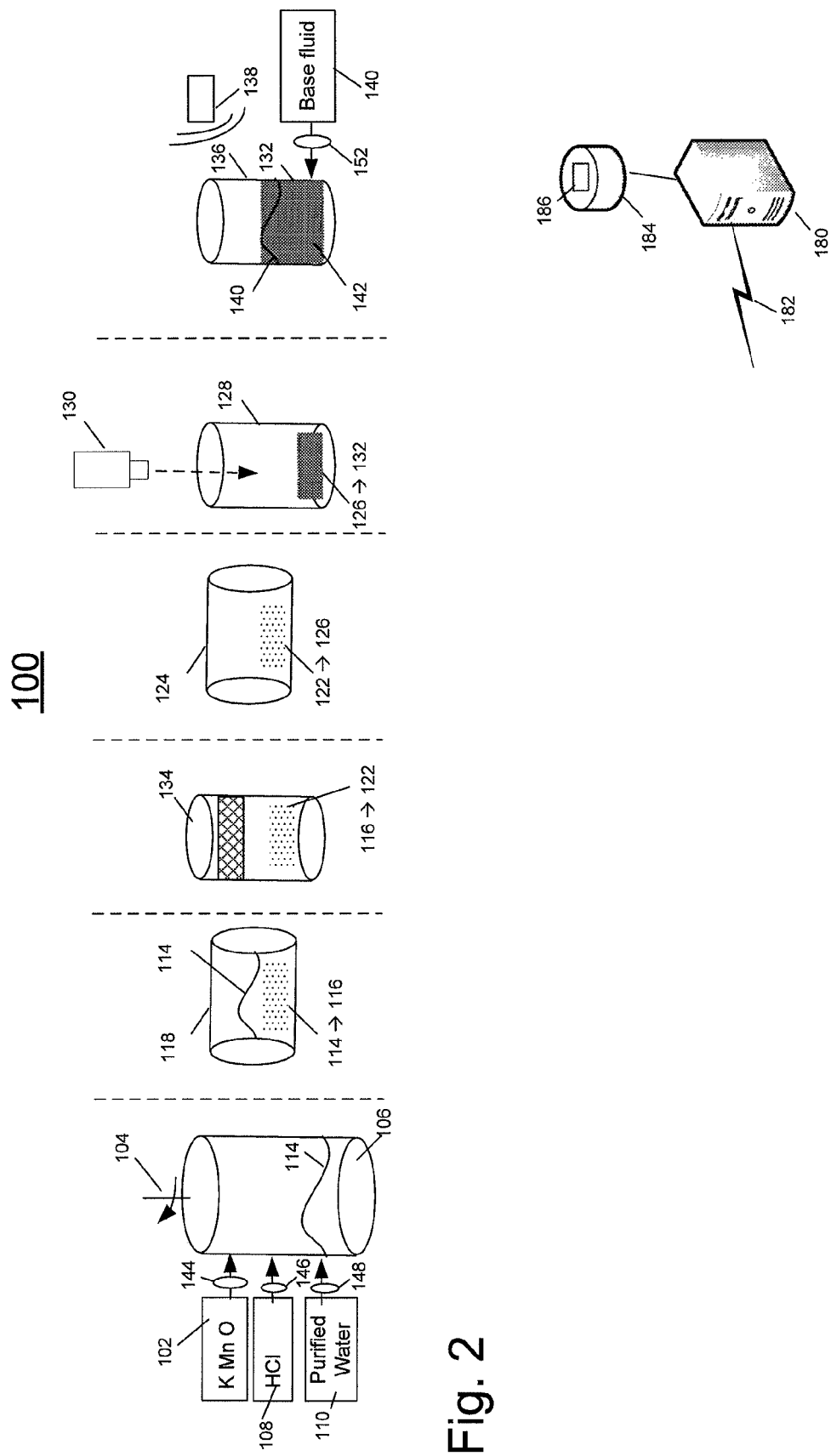
FIG. 2 illustrates an example system that can be utilized to implement nanofluid coolant formation.

FIG. 2 illustrates an example system that can be utilized to implement nanofluid coolant formation in accordance with at least some embodiments described herein. The system of FIG. 2 is substantially similar to system 100 of FIG. 1, with additional details. Those components in FIG. 2 that are labeled identically to components of FIG. 1 will not be described again for the purposes of clarity.

In an example, compound 102 may be combined with acid 108 and purified water 110 in container 106, such as by hand or machine through application of valves 144, 146, 148. In some example, the start, stop, and/or rate of the flow of various materials into container 106 via the valves may be facilitated by a control process that is operated by processor 180. In some examples, compound 102 may include potassium, manganese and oxygen, such as $KMnO_4$. Acid 108 may include, for example, HCl, $HNO_3$, $H_2SO_4$, etc. Purified water 110 may include, for example, distilled or de-ionized water. In an example, a ratio of $KMnO_4$ to HCl to purified water may be about 1.2 g:about 50 ml:about 50 ml. The combination of compound 102, acid 108 and purified water 110 may be stirred by stirrer 104 for a time interval of about 10 minutes to about 60 minutes to form a solution 114.

Solution 114 may then be placed, such as by hand or machine, in an oven 118. In an example, oven 118 may be an autoclave in an oil bath. In an example, oven 118 may be controlled (e.g., via a control process facilitated by processor 180) to a temperature in a range of about 100 degrees Celsius to about 180 degrees Celsius. Solution 114 may be heated in oven 118 for a time interval of about 10 hours to about 14 hours. A temperature of oven 118 may then be cooled to a temperature in a range of about 20 degrees Celsius to about 30 degrees Celsius over a time interval of about 1.5 hours to about 2 hours to form precipitates 116 including manganese and oxygen such as $MnO_2$. In some examples, precipitates 116 may be brown in color.

Precipitates 116 may be collected and filtered through a filter 134. Precipitates 116 may be rinsed and filtered with filter 134 to form a powder 122 including manganese oxide nanotubes. In some examples, filter 134 may include a nitro cellulose membrane filter or a TEFLON filter with a pore size of about equal to or less than 0.22 micrometers. In an example, filter 134 may be used in a decantation process. Powder 122 may be repeatedly filtered, such as for example four repetitions, through filter 134 including being washed with water, until powder 122 has a pH of about 7. The water may be at a temperature in a range of about 60 degrees Celsius to about 70 degrees Celsius.

Powder 122 may be placed, such as by hand or by machine, into an oven 124. Oven 124 may be controlled (e.g., via a control process facilitated by processor 180) to dry powder 122 at a temperature of about 70 degrees Celsius to about 90 degrees Celsius in air to form dried $MnO_2$ nanotubes 126. Dried $MnO_2$ nanotubes 126 may be placed, such as by hand or machine, in a container 128 including air. Electromagnetic radiation source 130 may be arranged in operative relationship with container 128. Electromagnetic radiation source 130 may be configured effective to, such as by control of processor 180, irradiate dried $MnO_2$ nanotubes 126 in container 128 with electromagnetic radiation in a wavelength of about 100 nm to about 400 nm for a time interval of about 1 hour to about 7 hours to form functionalized $MnO_2$ nanotubes 132. In an example, electromagnetic radiation source 130 may be adapted to irradiate light with a photon energy of about 4.9 eV. Light from electromagnetic radiation source 130 may be effective to dissociate oxygen molecules in container 128 into singlet and triplet oxygen atoms. These active oxygen species, when directed toward the $MnO_2$ nanotubes 132, may break molecular bonding of the surface of nanotubes 132. These oxygen species may also cause attachment of hydrophilic radicals, such as OH groups, with side chains to improve surface quality of nanotubes 132 and may make the surface of nanotubes 132 hydrophilic.

Functionalized $MnO_2$ nanotubes 132 may be combined, such as by hand or machine, through control of valve 152 with a base liquid 140 in container 136. Base liquid 140 may include a polar solvent such as distilled water, de-ionized water, ethylene glycol, propylene glycol, etc. In an example, a volume percentage of functionalized $MnO_2$ nanotubes 132 with respect to base liquid 140 may be about 0.0001 volume % to about 0.1 volume %.

A sonicator 138 may be controlled, such as by processor 180, to disperse functionalized $MnO_2$ nanotubes 132 in base liquid 140 for a time interval of about 20 minutes to about 60 minutes at about 20 kHz, to form nanofluid coolant 142. Sonicator 138 may help disperse nanotubes 132 resulting in a nanofluid including relatively homogenous dispersion of functionalized $MnO_2$ nanotubes 126 in base liquid 140.

Figure 3:
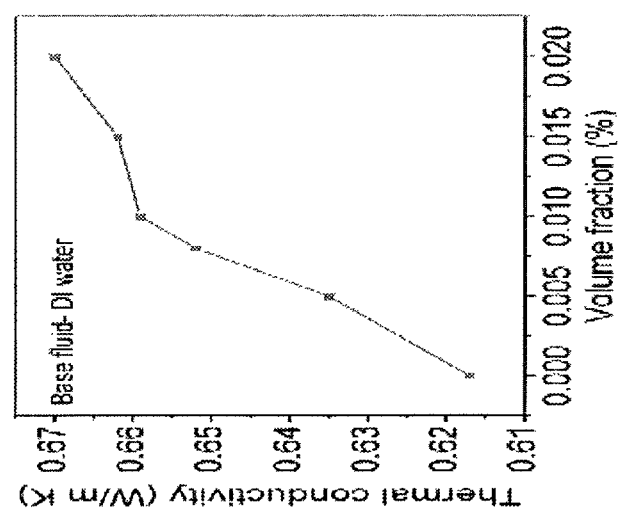
FIG. 3 illustrates a graph of Thermal conductivity (W/m K) v. Volume fraction (%) of $MnO_2$ nanotubes in a base fluid of de-ionized water.

FIG. 3 illustrates a graph of Thermal conductivity (W/m K) v. Volume fraction (%) of $MnO_2$ nanotubes in a base fluid of de-ionized water. FIG. 3 illustrates that, in an example, an increase in a volume fraction $MnO_2$ nanotubes, increases a thermal conductivity of the resultant nanofluid. As shown, for a Volume fraction of about 0.0% $MnO_2$ nanotubes, the Thermal conductivity was about 0.615 W/m K. For a Volume fraction of about 0.005% $MnO_2$ nanotubes, the Thermal conductivity was about 0.635 W/m K. For a Volume fraction of about 0.008% $MnO_2$ nanotubes, the Thermal conductivity was about 0.652 W/m K. For a Volume fraction of about 0.01% $MnO_2$ nanotubes, the Thermal conductivity was about 0.659 W/m K. For a Volume fraction of about 0.015% $MnO_2$ nanotubes, the Thermal conductivity was about 0.662 W/m K. For a Volume fraction of about 0.02% $MnO_2$ nanotubes, the Thermal conductivity was about 0.67 W/m K.

Figure 4:
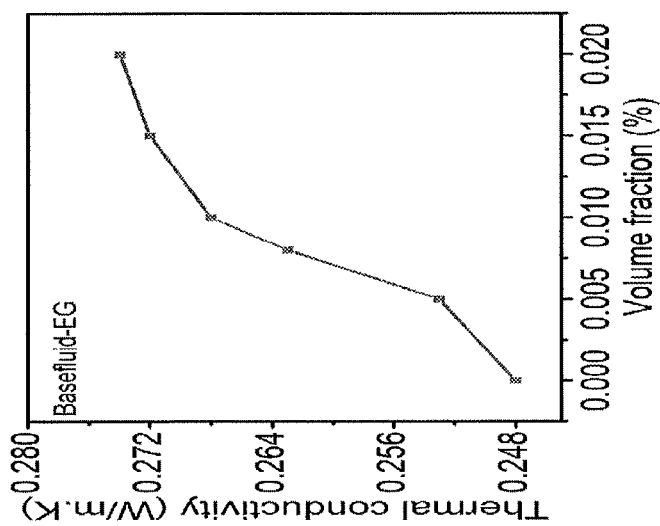
FIG. 4 illustrates a graph of Thermal conductivity (W/m K) v. Volume fraction (%) of $MnO_2$ nanotubes in a base fluid of ethylene glycol.

FIG. 4 illustrates a graph of Thermal conductivity (W/m K) v. Volume fraction (%) of $MnO_2$ nanotubes in a base fluid of ethylene glycol. FIG. 4 illustrates that, in an example, an increase in a volume fraction $MnO_2$ nanotubes, increases a thermal conductivity of the resultant nanofluid. As shown, for a Volume fraction of about 0.0% $MnO_2$ nanotubes, the Thermal conductivity was about 0.248 W/m K. For a Volume fraction of about 0.005% $MnO_2$ nanotubes, the Thermal conductivity was about 0.252 W/m K. For a Volume fraction of about 0.008% $MnO_2$ nanotubes, the Thermal conductivity was about 0.265 W/m K. For a Volume fraction of about 0.01% $MnO_2$ nanotubes, the Thermal conductivity was about 0.267 W/m K. For a Volume fraction of about 0.015% $MnO_2$ nanotubes, the Thermal conductivity was about 0.272 W/m K. For a Volume fraction of about 0.02% $MnO_2$ nanotubes, the Thermal conductivity was about 0.274 W/m K.

FIG. 5 illustrates a graph of Thermal conductivity (W/m K) v. Temperature (degrees Celsius) for $MnO_2$ nanotubes in a base fluid of de-ionized water. FIG. 5 illustrates that, in an example, as an operating temperature increases, a thermal conductivity of a nanofluid increases in proportion to a volume fraction of $MnO_2$ nanotubes. A summary of the data in the figure is repeated below.

| $MnO_2$ volume % relative to fluid volume | Thermal conductivity (W/m K) | Temperature (degrees Celsius) |
| --- | --- | --- |
| 0.005 | 0.635 | 25 |
| 0.005 | 0.654 | 30 |
| 0.005 | 0.6687 | 35 |
| 0.005 | 0.682 | 40 |
| 0.005 | 0.7 | 45 |
| 0.005 | 0.754 | 50 |
| 0.008 | 0.652 | 25 |
| 0.008 | 0.667 | 30 |
| 0.008 | 0.675 | 35 |
| 0.008 | 0.722 | 40 |
| 0.008 | 0.794 | 45 |
| 0.008 | 0.823 | 50 |
| 0.01 | 0.659 | 25 |
| 0.01 | 0.671 | 30 |
| 0.01 | 0.671 | 35 |
| 0.01 | 0.731 | 40 |
| 0.01 | 0.80 | 45 |
| 0.01 | 0.855 | 50 |
| 0.015 | 0.662 | 25 |
| 0.015 | 0.674 | 30 |
| 0.015 | 0.695 | 35 |
| 0.015 | 0.741 | 40 |
| 0.015 | 0.813 | 45 |
| 0.015 | 0.708 | 50 |
| 0.02 | 0.67 | 25 |
| 0.02 | 0.687 | 30 |
| 0.02 | 0.708 | 35 |
| 0.02 | 0.767 | 40 |
| 0.02 | 0.852 | 45 |
| 0.02 | 0.90 | 50 |

FIG. 6 illustrates a graph of Thermal conductivity (W/m K) v. Temperature (degrees Celsius) for $MnO_2$ nanotubes in a base fluid of ethylene glycol. FIG. 6 illustrates that, in an example, as an operating temperature increases, a thermal conductivity of a nanofluid increases in proportion to a volume fraction of $MnO_2$ nanotubes. A summary of the data in the figure is repeated below.

| $MnO_2$ volume % relative to fluid volume | Thermal conductivity (W/m K) | Temperature (degrees Celsius) |
| --- | --- | --- |
| 0.005 | 0.254 | 25 |
| 0.005 | 0.256 | 30 |
| 0.005 | 0.261 | 35 |
| 0.005 | 0.269 | 40 |

-continued

| $MnO_2$ volume % relative to fluid volume | Thermal conductivity (W/m K) | Temperature (degrees Celsius) |
|---|---|---|
| 0.005 | 0.272 | 45 |
| 0.005 | 0.279 | 50 |
| 0.008 | 0.264 | 25 |
| 0.008 | 0.268 | 30 |
| 0.008 | 0.271 | 35 |
| 0.008 | 0.274 | 40 |
| 0.008 | 0.284 | 45 |
| 0.008 | 0.279 | 50 |
| 0.01 | 0.267 | 25 |
| 0.01 | 0.271 | 30 |
| 0.01 | 0.279 | 35 |
| 0.01 | 0.283 | 40 |
| 0.01 | 0.286 | 45 |
| 0.01 | 0.292 | 50 |
| 0.015 | 0.272 | 25 |
| 0.015 | 0.278 | 30 |
| 0.015 | 0.281 | 35 |
| 0.015 | 0.285 | 40 |
| 0.015 | 0.296 | 45 |
| 0.015 | 0.296 | 50 |
| 0.02 | 0.274 | 25 |
| 0.02 | 0.279 | 30 |
| 0.02 | 0.283 | 35 |
| 0.02 | 0.287 | 40 |
| 0.02 | 0.301 | 45 |
| 0.02 | 0.305 | 50 |

FIG. 7 illustrates a graph of Electrical conductivity (µS/cm) v. Temperature (degrees Celsius) for de-ionized water and for $MnO_2$ nanotubes combined with a base fluid of de-ionized water. FIG. 7 illustrates that, in an example, as an operating temperature increases, an electrical conductivity of a nanofluid increases in proportion to a volume fraction of $MnO_2$ nanotubes and remains below 15 µS/cm at an operating temperature of 50 degrees Celsius. A summary of the data in the figure is repeated below. In an example, the electrical conductivity of 0.005 volume % manganese oxide nanotubes in a base fluid of ethylene glycol may be about 1.23 µS/cm at about 27 degrees Celsius and about 1.95 µS/cm at about 32 degrees Celsius.

| T (degrees C.) | Electrical conductivity of DI Water (µS/cm) | Electrical conductivity of 0.005 volume % MNT/DI Water (µS/cm) |
|---|---|---|
| 25 | 3.24 | 5 |
| 30 | 5.68 | 7.5 |
| 35 | 6.9 | 9 |
| 40 | 7.32 | 11 |
| 45 | 8.43 | 12.8 |
| 50 | 9.18 | 14.1 |

Among other possible benefits, a nanofluid coolant formed in accordance with the present disclosure may be used directly cool an object or device. For example, the object or device may be submersed in the nanofluid coolant and/or the nanofluid coolant may be flowed over the object or device. Liquid cooling may offer higher heat transfer coefficients than air cooling resulting in faster heat removal from a surface. A jet may be used for impingement cooling of hot spots using the nanofluid coolant. As the nanofluid coolant may have a relatively high thermal conductivity and a relative low electrical conductivity, the coolant may be used to directly cool electrical devices, or to cool devices where it is desirable to limit electrical conductivity such as circuit boards or servers.

In accordance with the present disclosure, the manganese oxide nanotubes may be functionalized in an environmentally friendly and cost effective manner with limited undesirable effluents. Surfactants need not necessarily be used to functionalize the nanotubes. Such surfactants may affect the viscosity, affect the thermal properties, corrode or otherwise affect the stability and/or properties of the manganese oxide nanotubes. As a relatively small percentage volume of manganese oxide nanotubes may be used, less agglomeration of particles may be realized so that pumping of the nanofluid coolant may be easier in examples where the nanofluid coolant is moved through or across a device.

Figure 8:
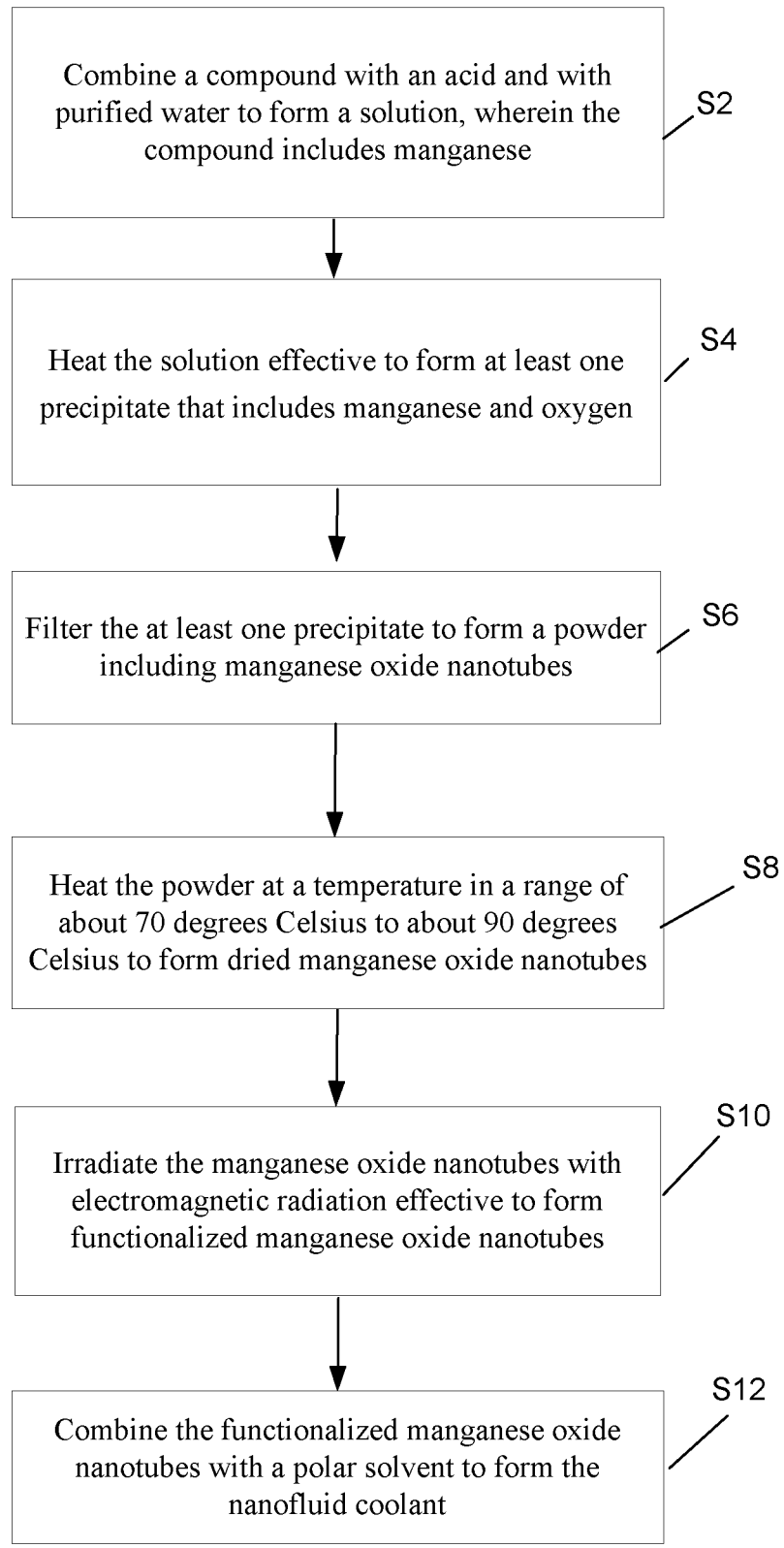
FIG. 8 depicts a flow diagram for an example process for forming a nanofluid coolant.

FIG. 8 depicts a flow diagram for an example process 200 for forming a nanofluid coolant in accordance with at least some embodiments described herein. The process in FIG. 8 could be implemented using, for example, system 100 discussed above where processor 180 may be adapted via instructions to control and facilitate the various processing operations, actions or functions through interfaces as will be further described with respect to FIG. 8. An example process may include one or more operations, actions, or functions as illustrated by one or more of blocks S2, S4, S6, S8, S10 and/or S12. Although illustrated as discrete blocks, various blocks may be divided into additional blocks, combined into fewer blocks, or eliminated, depending on the desired implementation.

Process 200 may begin at block S2, "Combine a compound with an acid and with purified water to form a solution, wherein the compound includes manganese." At block S2, a processor may be configured to combine, such as through control of containers and associated valves, a compound with an acid and with purified water. The combination may be stirred by a stirrer, under control by a processor, for a time interval of about 10 minutes to about 60 minutes to form the solution. In an example, the compound may be $KMnO_4$, the acid may be HCl, $HNO_3$, $H_2SO_4$, etc. and the purified water may be distilled and/or de-ionized water.

Processing may continue from block S2 to block S4, "Heat the solution effective to form at least one precipitate that includes manganese and oxygen." At block S4, a processor may be configured to control an oven to heat the solution to form at least one precipitate. In an example, the oven may be controlled to a temperature in a range of about 100 degrees Celsius to about 180 degrees Celsius. The solution may be heated in the oven for a time interval of about 10 hours to about 14 hours. A temperature of the oven may then be cooled to a range of about 20 degrees Celsius to about 30 degrees Celsius over a time interval of about 1.5 hours to about 2 hours to form the precipitates.

Processing may continue from block S4 to block S6, "Filter the at least one precipitate to form a powder including manganese oxide nanotubes." At block S6, the processor may be configured to control a filter to filter the precipitate to form a powder including manganese oxide nanotubes. The powder may be repeatedly filtered, such as for example four repetitions, through the filter including being washed with water, until the powder has a pH of about 7. The water may be at a temperature in a range of about 60 degrees Celsius to about 70 degrees Celsius.

Processing may continue from block S6 to block S8, "Heat the powder at a temperature in a range of about 70 degrees Celsius to about 90 degrees Celsius to form dried manganese oxide nanotubes." At block S8, the processor may be configured to control an oven to heat the powder at a temperature in a range of about 70 degrees Celsius to about 90 degrees Celsius to form dried manganese oxide nanotubes.

Processing may continue from block S8 to block S10, "Irradiate the manganese oxide nanotubes with electromagnetic radiation effective to form functionalized manganese oxide nanotubes." At block S10, the processor may be configured to control an electromagnetic source to irradiate the manganese oxide nanotubes with electromagnetic radiation to form functionalized manganese oxide nanotubes. In an example, the radiation may be between about 100 nm and about 400 nm and for a time interval of about 1 hour to about 7 hours.

Processing may continue from block S10 to block S12, "Combine the functionalized manganese oxide nanotubes with a polar solvent to form the nanofluid coolant." At block S12, the processor may be configured to combine, such as through control of containers and associated valves, the functionalized manganese oxide nanotubes with a polar solvent to form the nanofluid coolant. In an example, the polar solvent may be distilled water, de-ionized water, ethylene glycol, propylene glycol, etc. In an example, a volume percentage of functionalized manganese oxide nanotubes with respect to the base fluid may be about 0.0001 volume % to about 0.1 volume %. The processor may further control a sonicator to disperse the functionalized manganese oxide nanotubes in the base fluid to form the nanofluid coolant. In an example, the sonicator may be controlled to disperse the nanotubes for a time interval of about 20 minutes to about 60 minutes with waves at a frequency of about 40 kHz.

Figure 9:
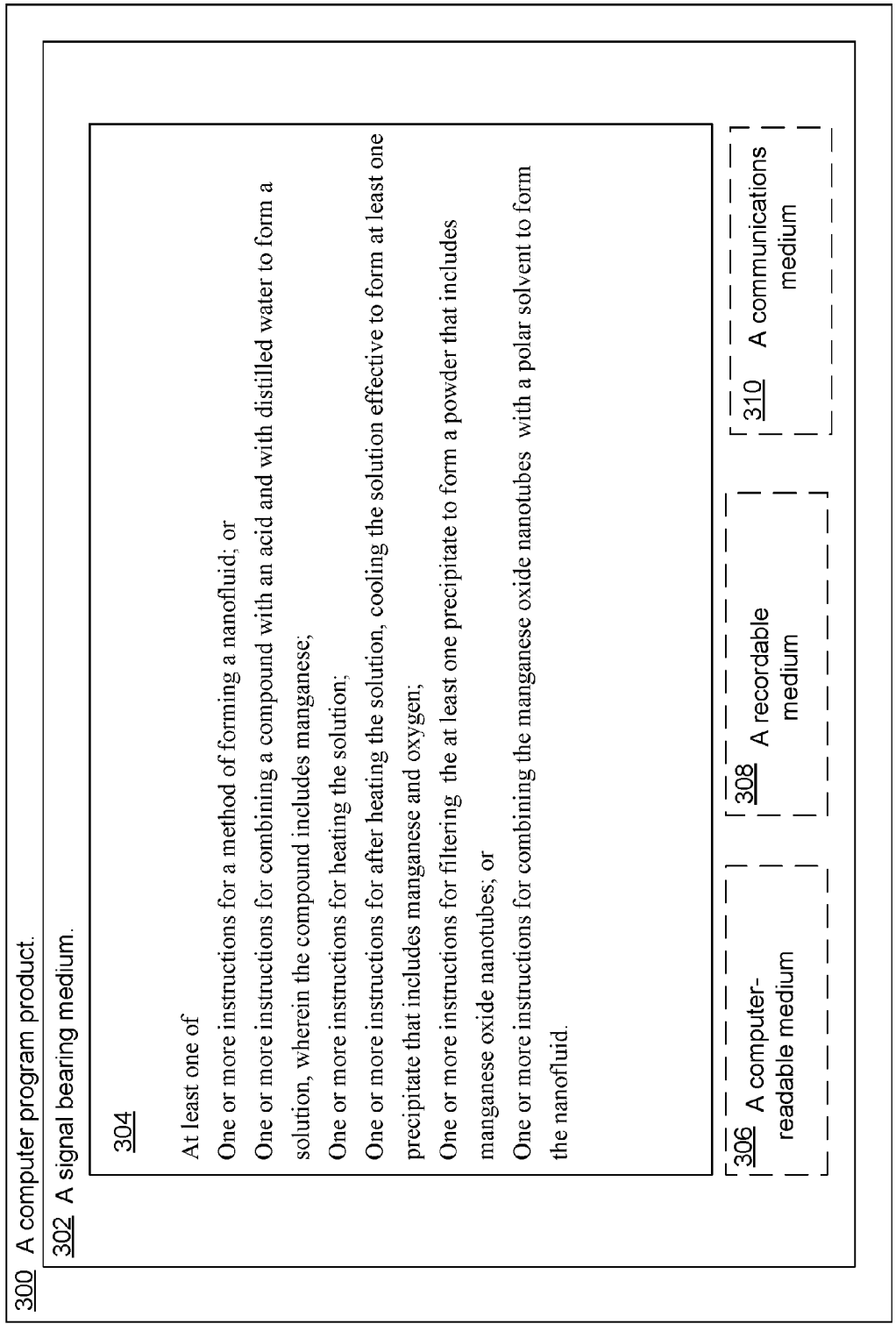
FIG. 9 illustrates a computer program product that can be utilized to implement nanofluid coolant formation.

FIG. 9 illustrates a computer program product that can be utilized to implement nanofluid coolant formation in accordance with at least some embodiments described herein. Computer program product 300 may include a signal bearing medium 302. Signal bearing medium 302 may include one or more instructions 304 that, when executed by, for example, a processor, may provide the functionality described above with respect to FIGS. 1-8. Thus, for example, referring to system 100, processor 180 may undertake one or more of the blocks shown in FIG. 9 in response to instructions 304 conveyed to the system 100 by signal bearing medium 302.

In some implementations, signal bearing medium 302 may encompass a computer-readable medium 306, such as, but not limited to, a hard disk drive, a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communications link, a wireless communication link, etc.). Thus, for example, computer program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 10 is a block diagram illustrating an example computing device that is arranged to implement nanofluid coolant formation according to at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor ($\mu$P), a microcontroller ($\mu$C), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a nanofluid coolant formation algorithm 426 that is arranged to perform the various functions/actions/operations as described herein including at least those described with respect to system 100 of FIGS. 1-9. Program data 424 may include nanofluid coolant formation data 428 that may be useful for implementing nanofluid coolant formation as is described herein. In some embodiments, application 422 may be arranged to operate with program data 424 on operating system 420 such that nanofluid coolant formation may be provided. This described basic configuration 402 is illustrated in FIG. 10 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood

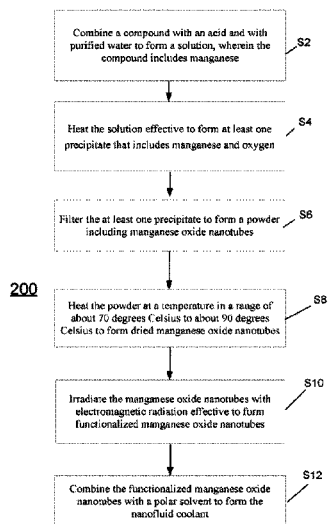

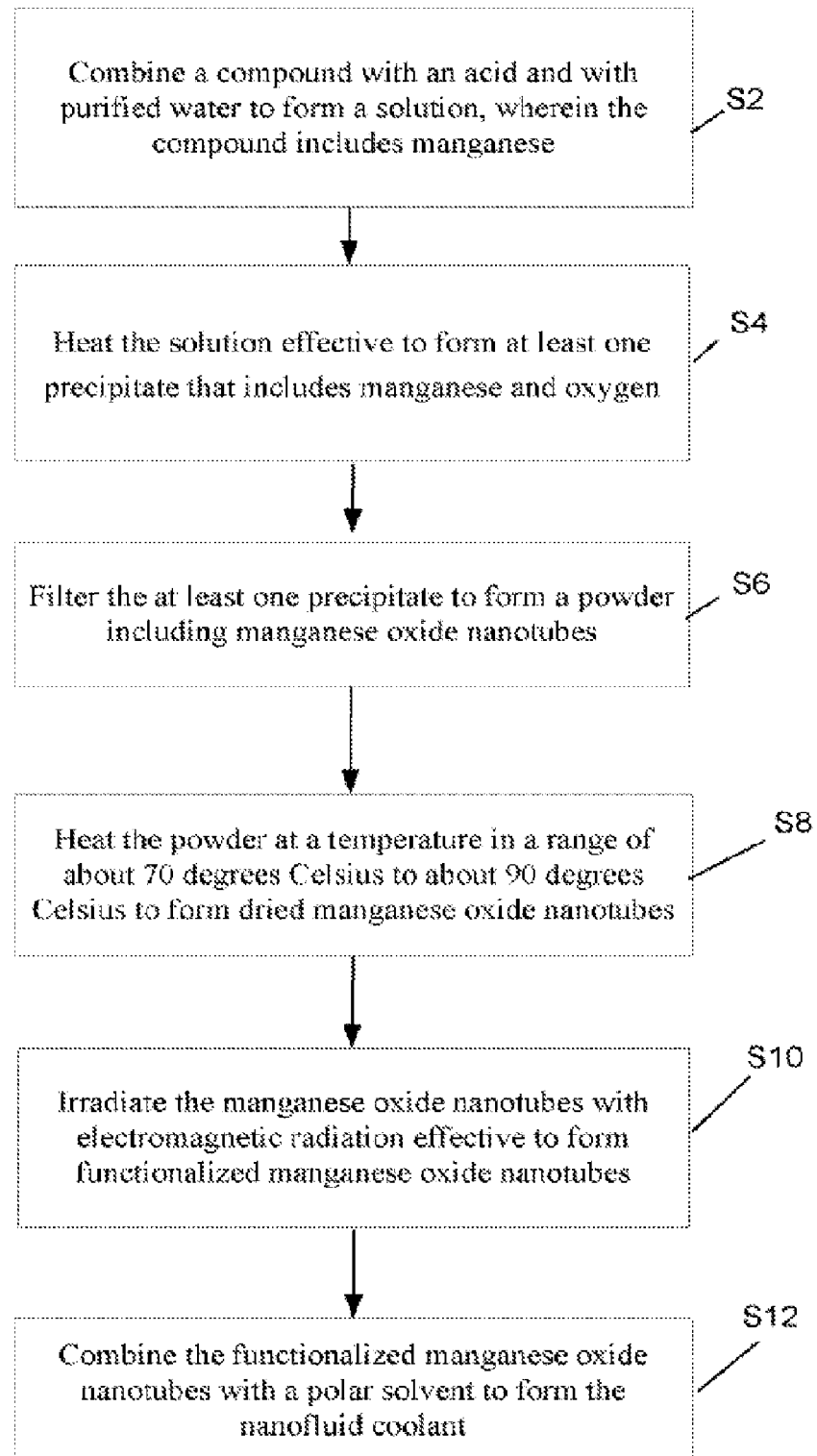

What is claimed is:

1. A method of forming a nanofluid, the method comprising:
combining a compound with an acid and with purified water to form a solution, wherein the compound includes manganese;
heating the solution;
after heating the solution, cooling the solution effective to form at least one precipitate that includes manganese, oxygen and manganese oxide nanotubes;
filtering the at least one precipitate to form a powder that includes at least some of the manganese oxide nanotubes;
irradiating the powder with electromagnetic radiation effective to form functionalized manganese oxide nanotubes; and
combining the functionalized manganese oxide nanotubes with a polar solvent to form the nanofluid.

2. The method as recited in claim 1, wherein the functionalized manganese oxide nanotubes comprise hydroxyl groups.

3. The method as recited in claim 1, wherein the polar solvent comprises at least one of de-ionized water, ethylene glycol or propylene glycol; and the compound comprises $KMnO_4$.

4. The method as recited in claim 1, wherein a volume percentage of the manganese oxide nanotubes in the nanofluid is in a range between about 0.0001 volume % and about 0.1 volume %.

5. The method as recited in claim 1, wherein:
the compound includes $KMnO_4$;
the polar solvent comprises at least one of de-ionized water, ethylene glycol or propylene glycol;
heating the solution further comprises heating the solution to a first temperature in a first range of about 100 degrees Celsius to about 180 degrees Celsius for a first time interval in a first time range of about 10 hours to about 14 hours;
cooling the solution further comprises cooling the solution to a second temperature in a second temperature range of about 20 degrees Celsius to about 30 degrees Celsius over a second time interval in a second time range of about 1.5 hours to about 2 hours;
a volume percentage of the functionalized manganese oxide nanotubes in the nanofluid is in a range between about 0.0001 volume % and about 0.1 volume %; and
the method further comprising:
heating the powder to a third temperature in a third temperature range of about 70 degrees Celsius to about 90 degrees Celsius to form dried manganese oxide nanotubes;
irradiating the dried manganese oxide nanotubes with electromagnetic radiation over a time interval effective to form the functionalized manganese oxide nanotubes, wherein the electromagnetic radiation has a wavelength in a range of about 100 nm to about 400 nm, and the time interval is in a range of about 1 hour to about 7 hours; and
dispersing the functionalized manganese oxide nanotubes in the polar solvent by sonication.

6. The method as recited in claim 1, wherein the manganese oxide nanotubes are hollow and have at least two physical dimensions, where each physical dimension is between about 1 nm and about 100 nm.

7. The method as recited in claim 1, wherein the nanotubes have a tube shape with a diameter in a range of about 25 nm to about 100 nm, a length in a range of about 1 mm to about 10 mm, and/or an aspect ratio of about 10 to about 100.

8. The method as recited in claim 1, wherein an electrical conductivity of the nanofluid is in a range of between about 5 µS/cm and about 15 µS/cm.

9. A method of forming a nanofluid, the method comprising:
combining $KMnO_4$ with an acid and with purified water to form a solution;
heating the solution;
after heating the solution, cooling the solution effective to form at least one precipitate that includes manganese, oxygen and manganese oxide nanotubes;
filtering the at least one precipitate to form a powder that includes at least some of the manganese oxide nanotubes;
irradiating the powder with electromagnetic radiation effective to form functionalized manganese oxide nanotubes; and
combining the functionalized manganese oxide nanotubes with a polar solvent to form the nanofluid,
wherein:
an electrical conductivity of the nanofluid is greater than about 53% of the electrical conductivity of the polar solvent at a temperature in a range of about 23 degrees Celsius to about 52 degrees Celsius;
a thermal conductivity of the nanofluid is greater than about 45% of the thermal conductivity of the polar solvent at a temperature in a range of about 23 degrees Celsius to about 52 degrees Celsius; and
a volume percentage of the functionalized manganese oxide nanotubes in the nanofluid is less than about 0.04 volume %.

* * * * *

UNITED STATES PATENT AND TRADEMARK OFFICE
CERTIFICATE OF CORRECTION

PATENT NO. : 9,464,220 B2
APPLICATION NO. : 13/883505
DATED : October 11, 2016
INVENTOR(S) : Sundara et al.

It is certified that error appears in the above-identified patent and that said Letters Patent is hereby corrected as shown below:

On the Title Page

Delete the title page and substitute therefore with the attached title page showing the corrected inventors in Item (12) and Item (75), and corrected illustrative figure.

In the Specification

In Column 1, Line 7, delete "§371" and insert -- § 371 --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*

(12) United States Patent
Sundara et al.

(10) Patent No.: US 9,464,220 B2
(45) Date of Patent: Oct. 11, 2016

(54) NANOFLUID COOLANT

(75) Inventors: Ramaprabhu Sundara, Chennai (IN); Jyothirmayee Aravind Sasidharannair Sasikaladevi, Trivandrum (IN)

(73) Assignee: Indian Institute of Technology Madras (IN)

( * ) Notice: Subject to any disclaimer, the term of this patent is extended or adjusted under 35 U.S.C. 154(b) by 551 days.

(21) Appl. No.: 13/883,505

(22) PCT Filed: Dec. 21, 2011

(86) PCT No.: PCT/IB2011/003101
§ 371 (c)(1),
(2), (4) Date: May 3, 2013

(87) PCT Pub. No.: WO2013/057535
PCT Pub. Date: Apr. 25, 2013

(65) Prior Publication Data
US 2013/0221267 A1    Aug. 29, 2013

(30) Foreign Application Priority Data
Oct. 19, 2011 (IN) .................. 3590/CHE/2011

(51) Int. Cl.
*C09K 5/00* (2006.01)
*C09K 3/18* (2006.01)
(Continued)

(52) U.S. Cl.
CPC ............ *C09K 5/10* (2013.01); *B82Y 30/00* (2013.01); *C01G 45/02* (2013.01); *C01P 2004/13* (2013.01); *C01P 2004/54* (2013.01); *C01P 2004/64* (2013.01)

(58) Field of Classification Search
CPC ...... C01G 45/1207; C09K 5/00; C09K 5/08; C09K 5/14; C09K 5/20; B82Y 40/00
USPC ............................................... 252/70, 71
See application file for complete search history.

(56) References Cited

U.S. PATENT DOCUMENTS 7,084,002 B2 * 8/2006 Kim .............. H01G 11/46
                                                      438/104
7,713,660 B2 * 5/2010 Kim .............. B82Y 30/00
                                                      423/605

(Continued)

FOREIGN PATENT DOCUMENTS

CN    101402471 A    4/2009
CN    101698512 A    4/2010

(Continued)

OTHER PUBLICATIONS

Qi Feng, Inorganic and Metallic Nanotubular Materials, Series. Topics in Applied Physics, Chapter 6 "Synthesis and Applications of Manganese Oxide Nanotubes", vol. 117, pp. 73-82, Mar. 5, 2010.*

(Continued)

*Primary Examiner* — Jane L Stanley
(74) *Attorney, Agent, or Firm* — Moritt Hock & Hamroff LLP; Steven S. Rubin, Esq.

(57) ABSTRACT

Technologies are generally described for forming a nanofluid coolant and structures including a nanofluid coolant. In an example, a method of forming a nanofluid coolant may comprise combining a compound with an acid and with purified water to form a solution. The compound may include manganese. The method may further include heating the solution and, after heating the solution, cooling the solution effective to form at least one precipitate that includes manganese and oxygen. The method may further include filtering the at least one precipitate to form a powder that includes manganese oxide nanotubes. The method may further include functionalizing the nanotubes by irradiating them with UV radiation. The method may further include combining the functionalized manganese oxide nanotubes with a polar solvent to form the nanofluid coolant.

9 Claims, 7 Drawing Sheets